United States Patent [19]
Ault et al.

[11] Patent Number: 5,632,032
[45] Date of Patent: May 20, 1997

[54] CROSS ADDRESS SPACE THREAD CONTROL IN A MULTITHREADED ENVIRONMENT

[75] Inventors: Donald F. Ault, Hyde Park; Ernest S. Bender; Jon K. Franks, both of Saugerties; Steven Walkowiak, Kingston, all of N.Y.

[73] Assignee: International Business Machines Corporation, Armonk, N.Y.

[21] Appl. No.: 192,929

[22] Filed: Feb. 7, 1994

[51] Int. Cl.$^6$ .............................. G06F 9/44; G06F 11/00
[52] U.S. Cl. ....................... 395/670; 395/677; 395/704
[58] Field of Search ............................... 371/19; 395/650, 395/670

[56] References Cited

U.S. PATENT DOCUMENTS

| | | | |
|---|---|---|---|
| 4,080,650 | 3/1978 | Beckett | 364/200 |
| 4,604,494 | 8/1986 | Hough | 364/200 |
| 4,819,234 | 4/1989 | Huber | 371/19 |
| 5,179,702 | 1/1993 | Spix et al. | 395/650 |
| 5,193,186 | 3/1993 | Tamaki et al. | 395/650 |
| 5,193,187 | 3/1993 | Strout, II et al. | 395/650 |
| 5,247,675 | 9/1993 | Farrell et al. | 395/650 |
| 5,293,620 | 3/1994 | Barabash et al. | 395/650 |
| 5,319,645 | 6/1994 | Bassi et al. | 371/19 |
| 5,355,484 | 10/1994 | Record et al. | 395/650 |
| 5,361,352 | 11/1994 | Iwasawa et al. | 395/700 |
| 5,371,746 | 12/1994 | Yamashita et al. | 371/19 |
| 5,442,788 | 8/1995 | Bier | 395/650 |

OTHER PUBLICATIONS

Ault et al., "Cross–Address Space Control Function", *IBM Technical Disclosure Bulletin*, vol. 36, No. 10, Oct. 1993, pp. 591–595.

Ault, "Interoperability Between MVS and Posix Functions", *IBM Technical Disclosure Bulletin*, vol. 35, No. 6, Nov. 1992, pp. 383–388.

Ault, "Fork Clone Address Space Implementation on MVS", *IBM Technical Disclosure Bulletin*, vol. 35, No. 6, Nov. 1992, pp. 363–367.

Tannenbaum, "Process and Processors in Distributed Systems", *Modern Operating Systems*, 1992, pp. 507–523.

"Introducing OpenEdition MVS", IBM Publication GC23–3010–00, Feb. 1993.

"MVS/ESA Support for IEEE POSIX Standards Technical Presentation Guide", IBM Publication No. GG24–3867–00, 1993.

Miller, Breakpoints & Halting in Distributed Programs, Distributed Computing Systems, 1988 Int'l Conf. pp. 316–323.

(List continued on next page.)

*Primary Examiner*—Kevin A. Kriess
*Assistant Examiner*—Lucien Toplu
*Attorney, Agent, or Firm*—William A. Kinnaman, Jr.

[57] ABSTRACT

A method of controlling the execution of the threads of a first application such as a user application from a second application such as a debugger application running in a different address space. After initializing trace mode for the user application, the debugger waits for an event to occur on one of the threads of the user application. Upon the occurrence of an event on one of the user application threads, an event handler obtains control of the thread execution. The event handler suspends execution of the remaining threads in the application, posts the debugger and then suspends its own execution. When the debugger application has completed its debugging operations, it posts the event handler, which resumes execution of the suspended threads and returns control to the thread on which the event occurred. If a subsequent event occurs on one thread while a previous event on another thread is being processed, the event handler for the subsequent event places it in a deferred event queue for deferred processing. Events consisting of breakpoints are redriven rather than being placed on the deferred queue. The debugger application may hold selected threads in a suspended state following resumption of the remaining threads by setting hold flags associated with those threads.

6 Claims, 12 Drawing Sheets

OTHER PUBLICATIONS

Youngsik et al, Software Abort & Multiprocessor Debugging, Tencon '93, 19–21 Oct. 1993.

Fowler et al, Causal Distributed Breakpoints, Distributed Computing Systems, 1990 Int'l Conf. pp. 134–141.

Anderson et al, The Performance Implications of Thread Management Alternatives for Shared–Memory Multiprocessors, IEEE Trans. on Comp. Dec. 1989, V:38 Issue 12 pp. 1631–1644.

Haban et al, Global Events & Global Breakpoints in Distributed Systems, System Sciences, 1988 Annual Hawaii Int'l Conf. vol. II pp. 166–175.

Scholten et al, A Debugging Tool for Distributed Systems, Tencon '93 1993 IEEE Region ID Conf. on Computer Comm. 19–21 Oct. 1993.

Scholten et al, On Debugging in a Parallel System, Tencon '90 1990 IEEE Region ID Conf. on Computer & Comm. pp. 264–268.

Lee et al, An Implementation of Software Tools for Replay & Partial Replay of Concurrent–C Programs, Compsac 1990, pp. 106–111.

Inohara et al, A Thread Facility Based on User/Kernel Cooperation in the Xero Operating System, Compsac 1991 pp. 398–405.

CROSS ADDRESS SPACE THREAD CONTROL IN A MULTITHREADED ENVIRONMENT

CROSS-REFERENCE TO RELATED APPLICATIONS

This application is related to the commonly owned copending application of D. F. Ault et al., Ser. No. 08/187, 675, entitled "QUIESCE TERMINATION/SUSPENSION IN A MULTITHREADED ENVIRONMENT" (Attorney Docket No. KI9-94-001), filed Jan. 27, 1994, the specification of which is incorporated herein by reference.

BACKGROUND OF THE INVENTION

1. Field of the Invention

This application relates to a method of facilitating the individual control of the threads of a multithreaded controlled application, such as a user application, by a controlling application, such as a debugger application, for debugging or other purposes.

2. Description of the Related Art

Computer operating systems—the software that interfaces between user applications and the hardware and performs the basic supervisory functions in a computer system—are well known in the art. Many modern operating systems allow for the use of multiple threads within a process, or application. A multithreaded application is defined as a program using more than one thread of control to perform its work. (The terms "process" and "application" are used interchangeably in this specification to refer to one or more threads sharing a common address space.) A. S. Tanenbaum, *Modern Operating Systems*, (1992), incorporated herein by reference, describes several modern operating systems generally, as well as threads in particular at pp. 507–23.

A particular example of an operating system supporting multithreaded applications is the IBM MVS/ESA operating system with its recently introduced OpenEdition MVS extension. The OpenEdition MVS extension allows applications written to the IEEE POSIX 1003.1, 1003.2 and 1003.4a (draft) standards to run on a hardware-software platform made up of an IBM System/390 computer and the MVS/ESA operating system. (IBM, OpenEdition, MVS/ESA and System/390 are trademarks of IBM Corporation.) Further information on the OpenEdition MVS extension may be found in the following publications, which are incorporated herein by reference:

Ault, "Fork Clone Address Space Implementation on MVS", *IBM Technical Disclosure Bulletin*, vol. 35, no. 6, pp. 363–67 (Nov. 1992);

Ault, "Interoperability Between MVS and POSIX Functions", *IBM Technical Disclosure Bulletin*, vol. 35, no. 6, pp. 383–88 (Nov. 1992);

Ault et al., "Cross-Address Space Control Function", *IBM Technical Disclosure Bulletin*, vol. 36, no. 10, pp. 591–95 (Oct. 1993);

*Introducing OpenEdition MVS*, IBM Publication No. GC23-3010-00 (1993);

*MVS/ESA Support for IEEE POSIX Standards: Technical Presentation Guide*, IBM Publication No. GG24-3867-00 (1993).

As noted above, the OpenEdition MVS extension of the MVS/ESA operating system allows for the use of multiple threads within a process. In MVS terms, a thread can be thought of as a task. Multiple threads thus equate to the use of multiple MVS tasks within an MVS address space. OpenEdition MVS user applications use mutexes and condition variables to perform multithreaded work. Mutexes are simple locks, and condition variables provide controlled access to shared storage using mutexes.

Debugger applications that work with multithreaded user applications, such as OpenEdition MVS user applications, need support that allows the debugging of such multithreaded applications. For example, the constructs of mutexes and condition variables referred to above are unique to multithreaded applications and require unique support to allow debugging of applications using these constructs.

Previous systems have solved the problem of debugging multithreaded applications by directly looking at whatever control blocks were needed. No service was provided to allow general multithreaded debugging.

SUMMARY OF THE INVENTION

The present invention contemplates, in a computer system having a controlling application executing in a controlling address space and a controlled application comprising a plurality of threads executing concurrently in a controlled address space separate from the controlling address space, a method of handling the occurrence of an event on a first thread (the "focus thread") of the controlled application so as to facilitate processing of the event by the controlling application. (The "first" thread is identified as such merely to distinguish it from the additional threads of the application; it is not necessarily the first thread in the application to have been created.) Typically, the controlling application is a debugger application, while the controlled application is a user application being debugged by the debugger application.

In accordance with the invention, the controlling application initially suspends execution pending notification of the occurrence of an event on one of the threads of the controlled application. Upon the occurrence of such an event, control of the thread on which the event occurs passes to an event handler. The event handler first suspends the execution of each additional thread of the controlled application. The event handler then notifies the controlling application of the event to permit processing of the event by the controlling application and suspends execution of the first thread pending the completion of processing of the event by the controlling application. When it has finished processing the event, the controlling application resumes execution of the first thread, which thereupon resumes execution of each of the additional threads.

In accordance with another aspect of the present invention, subsequent events on other threads that cannot be processed immediately because a previous event on a first thread is currently being processed are placed in a deferred event queue. When processing for the previous event has been completed, the first thread, upon being resumed by the debugger application, checks the event queue to determine whether it is empty. If so, the first thread resumes the other threads and the normal execution of the user application is resumed. If the event queue is not empty, the first thread resumes the thread of the first event in the queue, which removes the event from the queue and proceeds to process the event by notifying the controlling application and suspending execution until resumed by the controlling application. The process continues in this manner until all events have been removed from the queue and processed. This provides a mechanism for resolving contention among events occurring simultaneously on different threads of the controlled application and for serializing the presentation of such events to the controlling application.

In accordance with yet another aspect of the present invention, a hold flag is defined for each of the threads. The controlling application sets the corresponding hold flag for each thread that is to be held in a suspended state following the resumption of the remaining threads. Upon being resumed by the controlling application, the first thread checks the hold flags of the additional threads and resumes only those threads whose hold flags are not set. The first thread thereafter checks its own hold flag and suspends itself if its hold flag has been set. This feature is useful when a user may wish to have a debugger application control the flow of a user application by preventing one or more threads from running. This can be used, for example, to step through the instructions of the user application on one thread, while holding all other threads to prevent any interference.

With this invention, very precise control of multithreaded applications is possible for testing purposes. (Debuggers can be used for debugging problems or just testing in general.) A debugger user, using the present invention, can precisely control the processing of various threads, creating contention if desired, allowing threads to perform work in precise sequences and the like. This is a very powerful tool, which can be used to test multithreaded application code such as that written for OpenEdition MVS.

The present invention allows a debugger to control the execution of multiple threads by holding some threads and setting breakpoints while other threads continue to execute. This capability allows the debugger to easily recreate application scenarios that represent race conditions and mutex contention. Normal execution of an application during testing might never expose these race or contention situations, which would allow bugs to be shipped in a product. Therefore, the greater control provided by this invention will allow applications to be more thoroughly tested and yield a higher-quality product.

Other aspects of the present invention contemplate a generic debugger interface (GDI) for facilitating the handling of high-level language run-time events on the controlled application, as well as a mechanism for changing the focus thread from the controlling application.

DESCRIPTION OF THE PREFERRED EMBODIMENT

Figure 1:
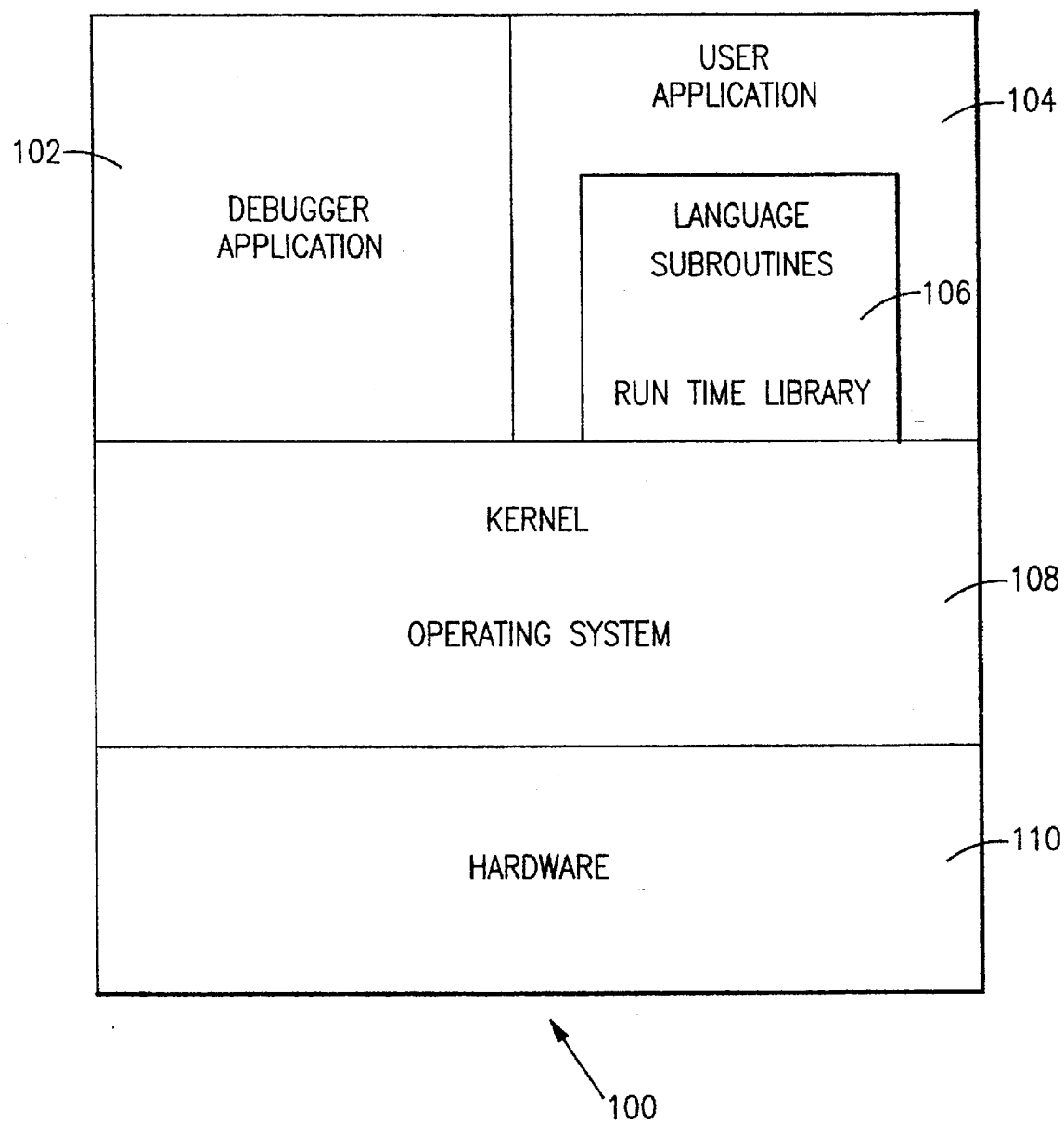
FIG. 1 is a schematic block diagram of the various hardware and software layers of a computer system incorporating the thread control function of the present invention.

FIG. 1 is an overview of a computer system 100 incorporating the present invention, showing the relationships between the system layers for the implementation of the cross address space thread control function, called ptrace in this specification. These layers are, starting from the top of FIG. 1, the debugger application and user application layers 102 and 104, the language subroutine and run-time library (RTL) layer 106, the operating system or kernel layer 108, and the hardware layer 110.

At the base of the system 100 is the hardware layer 110, which consists of one or more central processing units (CPUs), main memory and input/output (I/O) devices such as magnetic disk drives, magnetic tape drives, terminals, printers and the like. These components are conventional in the art and are hence not separately shown.

Kernel layer 108, the next layer above the hardware layer 110, consists of software that controls the base hardware layer, managing its CPU(s), memory and I/O devices, and contains a set of callable services (including the thread control services to be described) that provides application code access to the resources at the hardware layer. Kernel layer 108 runs in its own address space, separate from those of the user and debugger applications to be described below. Kernel layer 108 may comprise the IBM MVS/ESA operating system with its OpenEdition MVS extension, running on a hardware layer 110 comprising an IBM System/390 computer. However, the present invention is not limited to such a hardware/software platform, and other platforms could alternatively be used.

Language subroutine and run-time library (RTL) layer 106 is located directly above the kernel layer 106. Layer 106 consists of routines to support high-level languages (HLLs) used by many applications. Layer 106 essentially transforms the requested HLL function into the appropriate kernel service(s) to complete the request.

User application layer 104, containing one or more user applications, is the top layer of the system 100. Applications can request system services directly from the kernel layer 108 or via a HLL through the language subroutine and run-time library layer 106. For the purposes of this specification, the user application layer 104 and the language subroutine and run-time library 106 may be collectively regarded as the user application. As is discussed below in more detail, user application 104 is made up of a plurality of concurrently executing threads, which have many of the attributes of independent processes but, unlike independent processes, share a common address space separate from that of the kernel layer 108.

The debugger application 102 (hereinafter referred to as simply the "debugger") is an instance of a user application that performs debugging functions on the user application 104. Debugger 102, which runs in its own address space separate from those of the user application 104 and kernel layer 108, uses the cross address space thread control function of the present invention to perform these debugging functions. Debugger application 102 is also referred to herein as the "controlling application", while the user application 104 that is being debugged is also referred to herein as the "controlled application".

Figure 2:
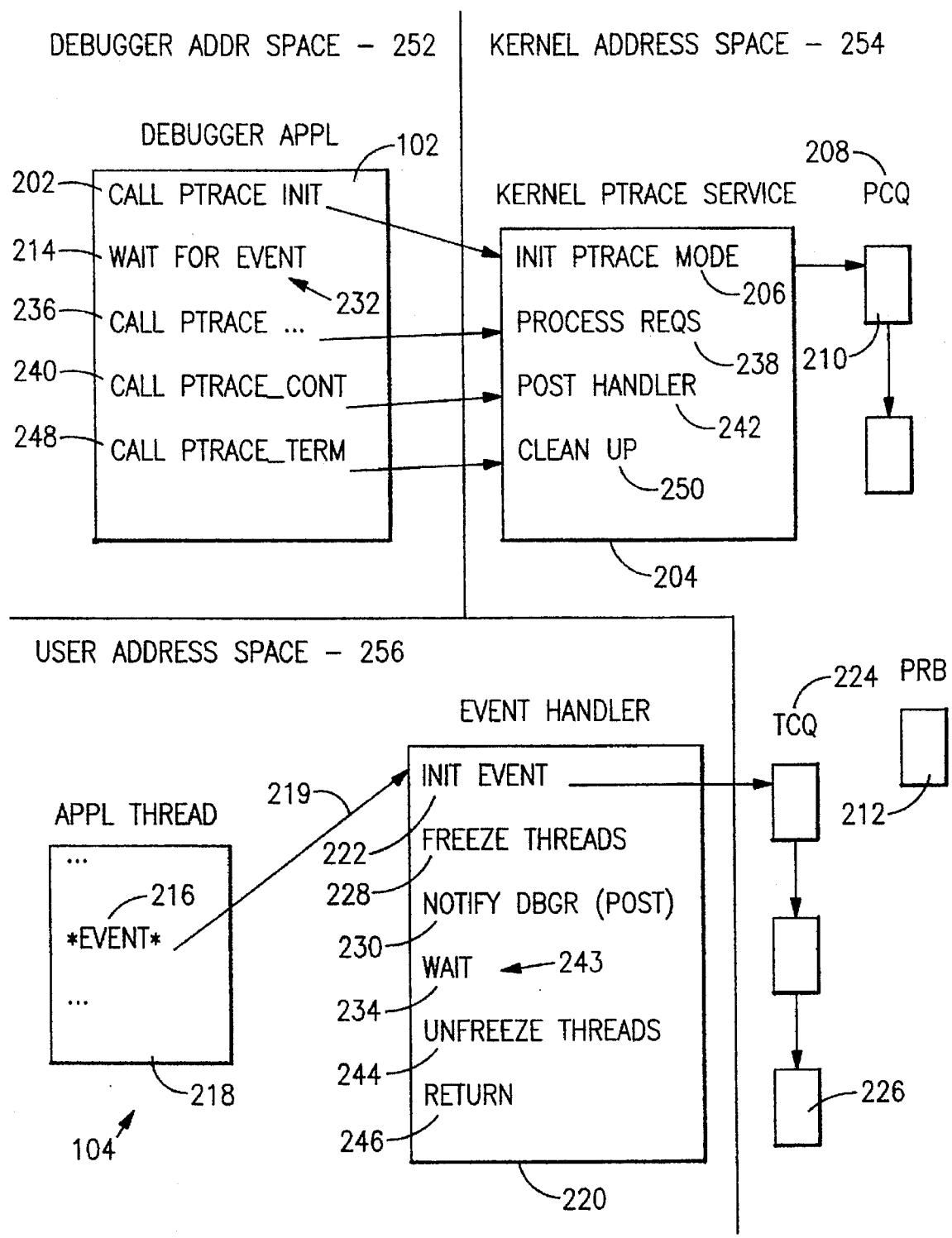
FIG. 2 shows the general operational flow of the thread control function of the present invention.

FIG. 2 is an overview of the flow of the debugger 102 and the kernel thread control function also referred to herein as ptrace. The flows for specific ptrace functions are slightly more involved and are shown in more detail in subsequent views.

As shown in FIG. 2, the debugger application 102 executes in a debugger address space 252, while the user application 104 (including all of its threads) executes concurrently in a user address space 256 separate from address space 252.

To initialize ptrace mode for the user application 104, the debugger 102 calls (202) the ptrace service 204, located in the kernel layer 108 (FIG. 1). Ptrace service 204 executes in a kernel address space 254 separate from the debugger address space 252 and user address space 256. Ptrace service 204 is normally used to process ptrace requests from the debugger 102. In addition, it is used by other entities outside the kernel layer 108, such as the generic debugger interface (GDI) interceptor to be described, to initiate ptrace events. The basic operation of the ptrace service 204 (not involving the thread control of the present invention) is described in the above-identified publication of Ault et al., "Cross-Address Space Control Function", *IBM Technical Disclosure Bulletin*, vol. 36, no. 10, pp. 591–95 (Oct. 1993), incorporated herein by reference. The present invention involves an extension of the control function described in that publication to handle multithreaded applications.

Figure 8:
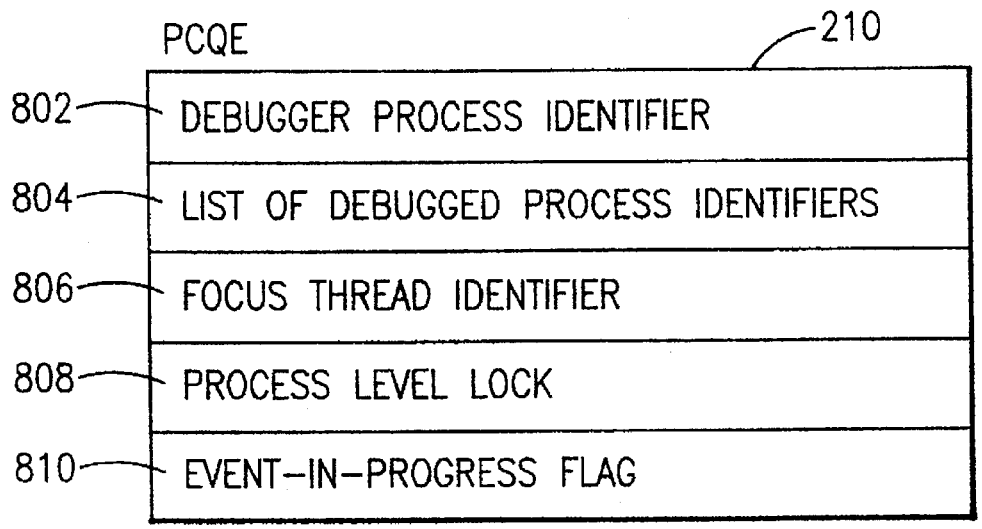
FIG. 8 shows a process control queue (PCQ) element used by the thread control function of the present invention.

To keep track of the identities of the debugger application 102 and the one or more user applications 104 being debugged, as well as to keep track of the particular thread on which an event occurred and which is the object of inquiry (also referred to as the "focus thread"), ptrace service 204 uses a defined area in system memory referred to herein as a process control queue (PCQ) 208 containing PCQ elements (PCQEs) 210. There is one PCQ element 210 for each process, such as debugger application 102 or user application 104, in the system 100. Referring now also to FIG. 8, each PCQ element 210 contains memory locations for storing a debugger process identifier 802 identifying the debugger application 102, a list of debugged process identifiers 804 identifying the one or more user applications 104 being debugged, a focus thread identifier 806 identifying the particular thread that is the object of inquiry, and a process-level lock 808 and event-in-progress flag 810 that are used to resolve event contentions in a manner to be described below. List 804 appears only in the PCQ element 210 of a debugger application 102, while debugger process identifier 802 and focus thread identifier 806 appear only in the PCQ element 210 of a user application 104 being debugged.

The kernel ptrace service 204 initializes (206) ptrace mode by storing the identifier of the debugger application 102 in the debugger process identifier area 802 of the PCQ entry 210 for the user application 104, as well as saving the identifier of the user application 104 in the list 804 of debugged process identifiers in the PCQ entry 210 for the debugger 102.

Figure 10:
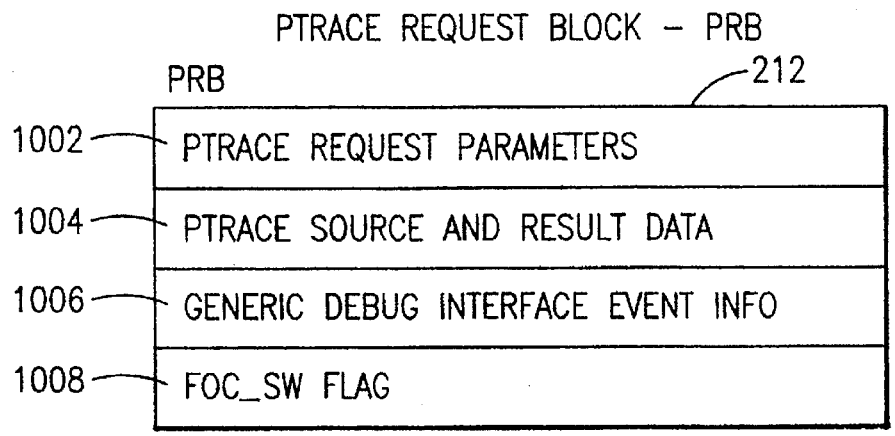
FIG. 10 shows a ptrace request block (PRB) used by the thread control function of the present invention.

Ptrace service 204 also creates a Ptrace Request Block (PRB) 212 for the user application. Referring now also to FIG. 10, PRB 212 is a defined area in system memory containing locations for storing ptrace request parameters 1002 for certain ptrace requests, ptrace source and result data 1004 that are either input to or output from certain ptrace requests, generic debugger interface event information 1006 to be described below, and a focus switch (foc__sw) flag 1008 to be described below.

The debugger 102 then waits (214) for an event 216 to occur on one of the threads 218 of the user application 104 (FIG. 1). When an event 216 occurs, an event notification 219 interrupts the flow of the user application 104 and results in a call to a ptrace event handler 220. The event handler 220 initiates (222) the start of the event by storing an event identifier 904 (FIG. 9) in an element (TCQE) 226 of a Thread Control Queue (TCQ) 224 for the user application thread 218. Event handler 220 then synchronously suspends, or freezes (228), all other (i.e., nonfocus) threads in the user application 104 by sending a suspension event to each such nonfocus thread as described in the above-identified copending application of D. F. Ault et al. entitled "QUIESCE TERMINATION/SUSPENSION IN A MULTI-THREADED ENVIRONMENT". This is done to prevent processing problems in the user application 104 and to maintain a known environment for processing ptrace system call requests issued by the debugger 102. Event handler 220 then sends (230) a post notification 232 to the debugger 102, and waits (234) to be posted. Thus, when the debugger 102 gets notified of the event 216, it is guaranteed that all threads in the user application 104 are stopped and that its status will remain unchanged until the debugger instructs the user application to resume execution.

The debugger 102 then calls (236) the ptrace service 204 to perform the appropriate ptrace requests, based on the event that occurred, the user application environment, and the debugger user's input. These ptrace requests are processed (238) as appropriate by the kernel ptrace service 204 or by the event handler 220 as necessary; the manner in which the work is divided between the kernel ptrace service and the event handler is not part of the present invention. When the debugger 102 wants the user application 104 to continue running from the point of the interruption by event 216, it calls (240) the ptrace service 204 to perform the ptrace continue request. This request causes the kernel ptrace service 204 to send (242) a post notification 243 to the event handler 220, which wakes it up out of its wait.

The event handler 220 then unfreezes (244) all other user application threads, and returns (246) control to the user application thread 218 at the point of interruption by the event 216 of interest.

When the debugger 102 wishes to stop debugging the user application 104, it calls (248) the ptrace service 204 to perform the ptrace termination request, which causes ptrace mode to be cleaned up (250) for the user application 102. This cleanup procedure (250) is essentially the reverse of the initialization procedure (206).

Figure 3:
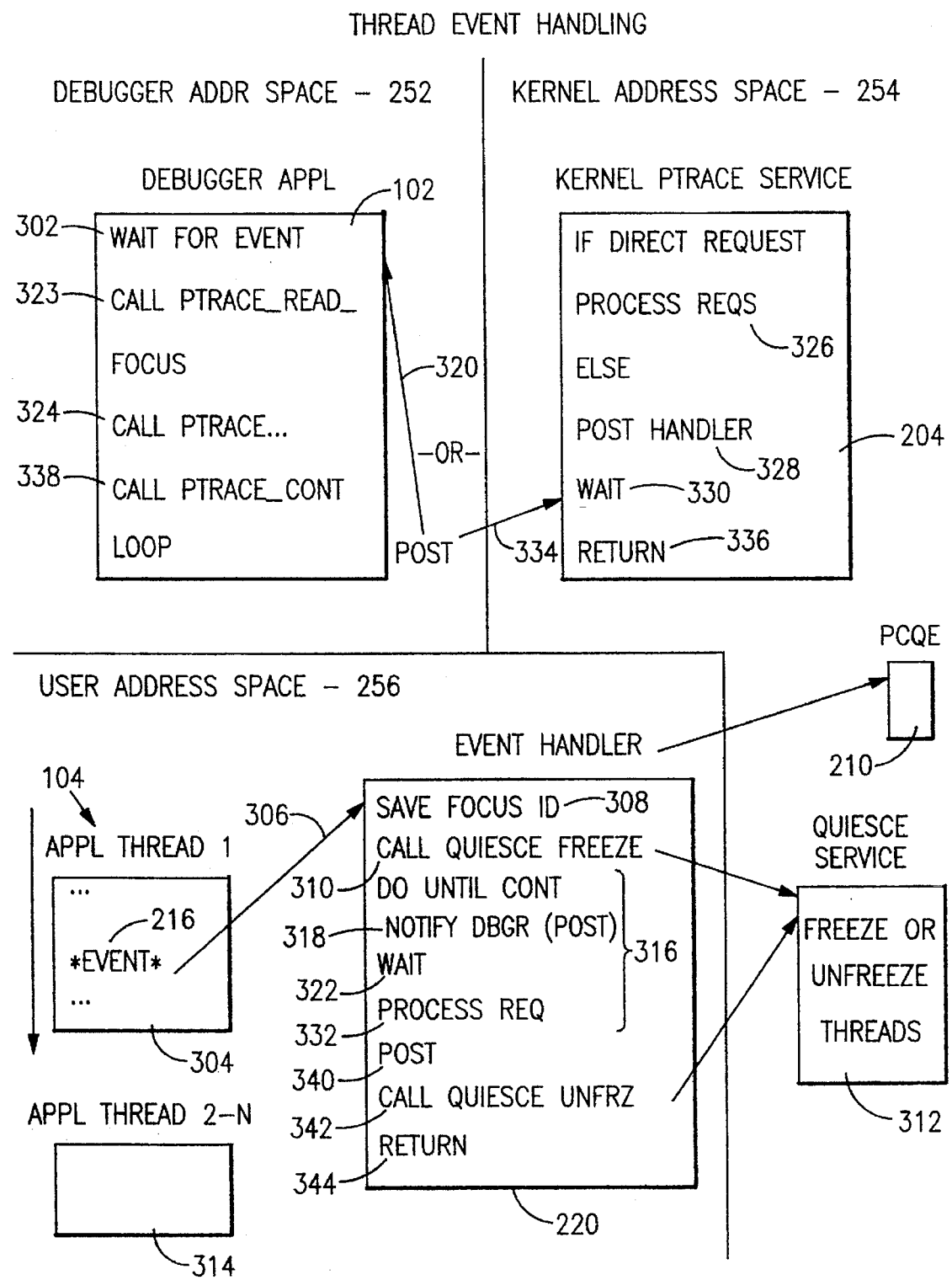
FIG. 3 shows in more detail the thread event handling of the thread control function shown in FIG. 2.

FIG. 3 shows in more detail how an event on a thread is processed. As previously described, the debugger 102 waits (302) for an event 216 to occur in the user application 104. When an event 216 occurs on a first thread (thread 1) 304 of the application 104 (also called the "focus thread" in the discussion that follows), an event notification 306 results in a call to the event handler 220.

The event handler 220 marks (308) thread 304 as the focus thread by storing an identifier 806 (FIG. 8), identifying thread 304 as the focus thread, in the PcQ entry 210 for the user application 104. Next, the event handler 220 calls (310) a kernel quiesce service 312 to freeze all other threads 314 (threads 2 through N) in user application 104 except for thread 304. The details of the internal operation of the quiesce service 312, which are not part of the present invention, are described in the above-identified application of D. F. Ault et al. The event handler 220 then enters a loop 316 to process ptrace requests issued by the debugger 102 until a ptrace continue request is issued.

Within the loop 316, the event handler notifies (318) the debugger 102 of the event 216 with a post 320, as described above, and the event handler 220 waits (322) to be posted. Debugger 102 may now call (323) the ptrace service 204 for a read_focus request. Ptrace service 204 processes the read_focus request by reading the focus thread identifier 806 (FIG. 8) in the PCQ element 210 for user application 104 and returning it to the debugger 102. This is how the debugger 102 identifies the focus thread 304. Ptrace requests issued (324) thereafter by the debugger 102 are targeted to the focus thread 304 as indicated by the focus thread identifier 806. These ptrace requests cause the ptrace service 204 either to process the request directly, if it can do so (326), or to post (328) the event handler 220, which is currently waiting (322), and wait (330). In the latter case, the event handler 220 processes (332) these requests, then loops back to notify (318) the debugger 102. Because at this time the ptrace service 204 is waiting (330) on behalf of the debugger 102, this notification results in the ptrace service 204 being posted (334). Upon being posted, ptrace service 204 returns (336) to the debugger 102.

The debugger 102 eventually issues (338) a ptrace continue request, causing the ptrace service 204 to post (328) the event handler 220 (which was in a wait at 322) and wait (330). The event handler 220 exits its internal loop 316, posts (340) the ptrace service 302, and calls (342) the quiesce service 312 to unfreeze all threads 314 that were previously frozen. The event handler 220 then returns (344) control to thread 304 at the point of interruption of the event 216.

Because the threads of user application 104 run asynchronously relative to one another, events may occur on more than one thread simultaneously before the event handler 220 (FIG. 3) calls (310) the quiesce service 312 to suspend the nonfocus threads 314. (By "simultaneously" is meant merely that the subsequent event occurs before processing of the previous event has been completed.) This creates event contention, with the contention winner becoming the focus thread. The other contending threads are suspended prior to reporting their events to the debugger 102, and the threads in question are placed in a deferred event queue referred to herein as an event pipeline queue (EPQ).

Figure 4:
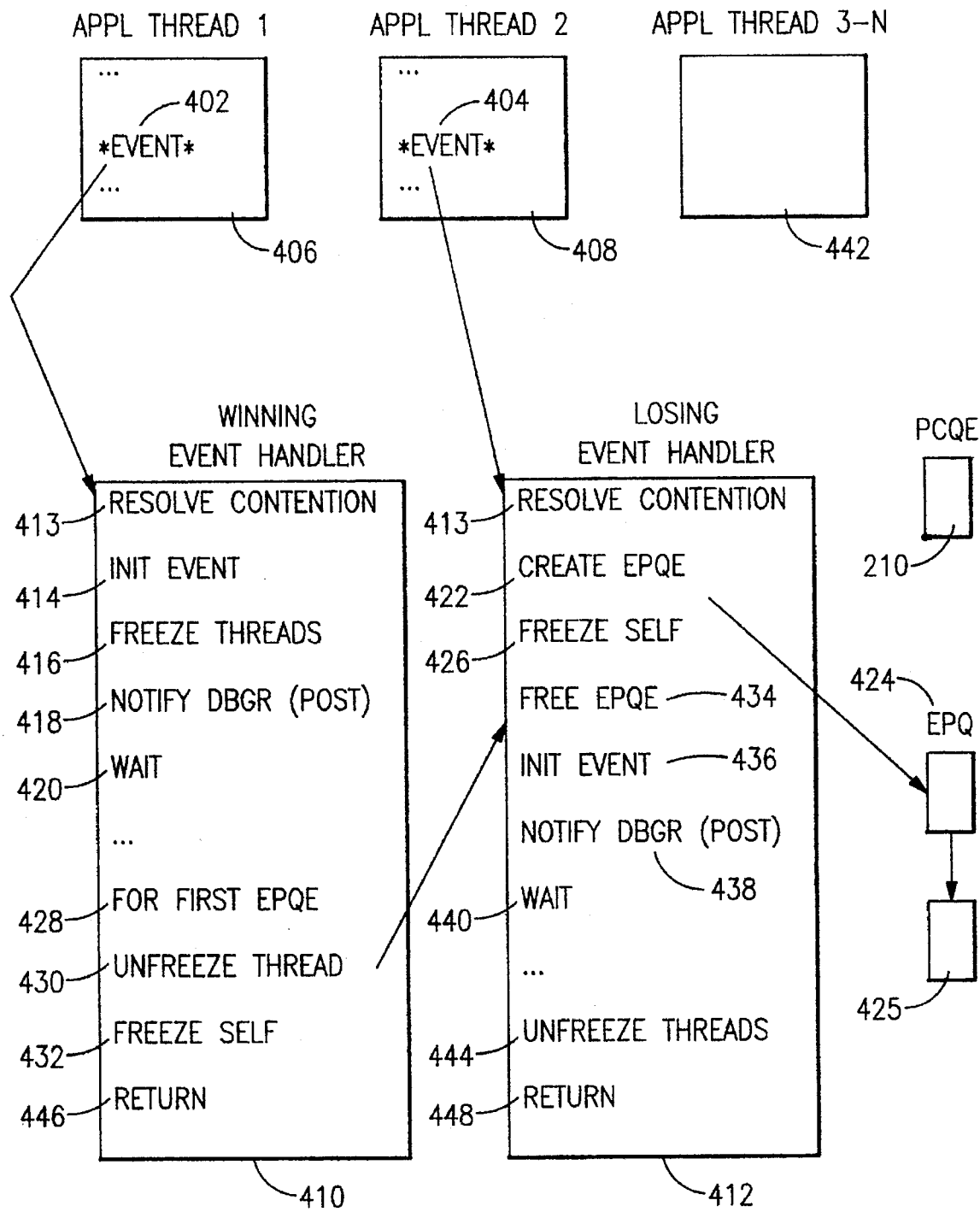
FIG. 4, 4a and 4b show the manner in which the thread control function of the present invention handles events occurring simultaneously on two threads of the same user application.
Figure 4A:
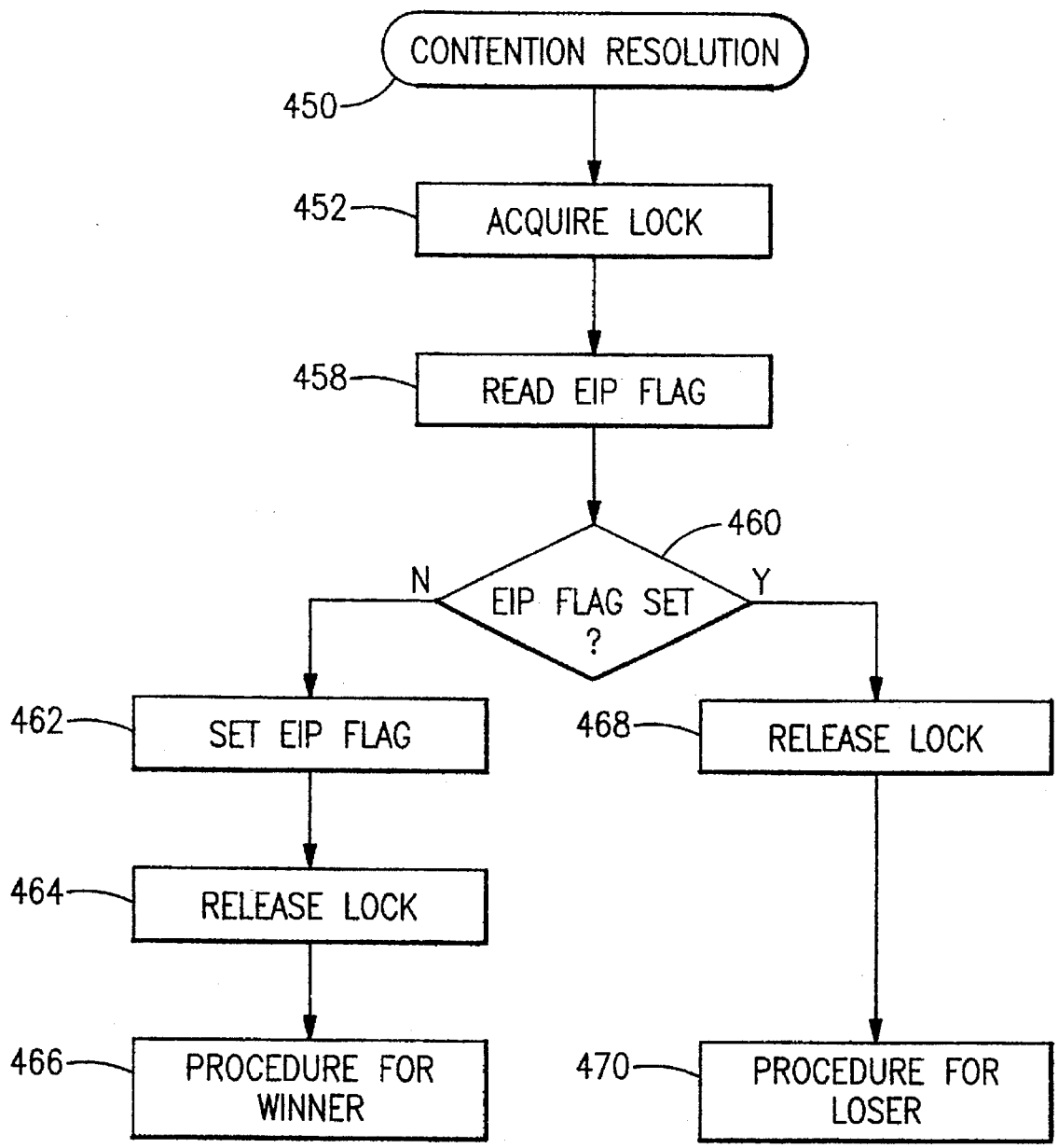
Figure 4B:
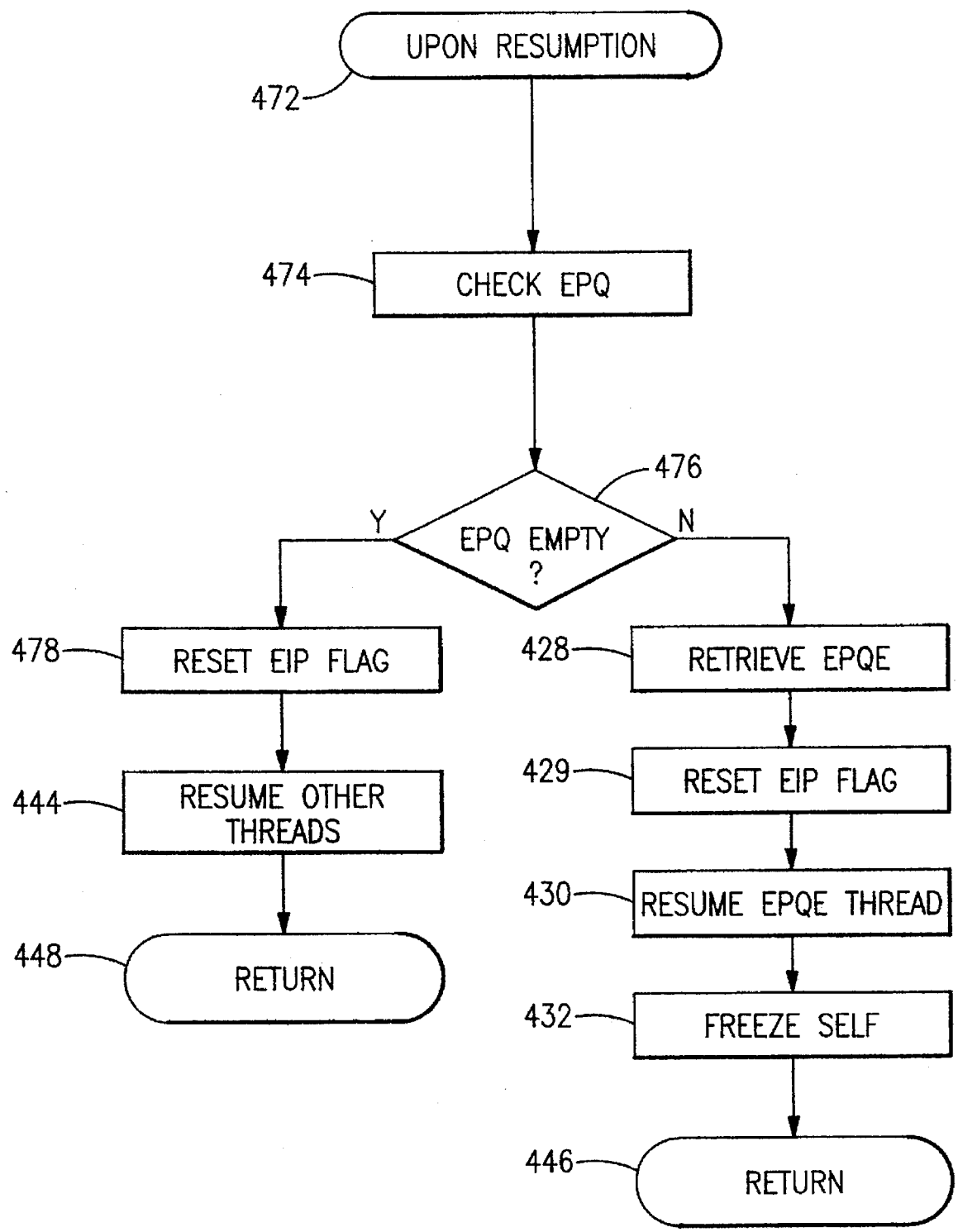

FIGS. 4, 4a and 4b show the processing of simultaneous events. Simultaneous events 402 on thread 406 (thread 1) and 404 on thread 408 (thread 2) result in respective event handlers 410 and 412 running on behalf of these threads to be called.

Upon gaining control from their respective threads, event handlers 410 and 412 first resolve (413) the contention between events 402 and 404 using the procedure 450 shown in FIG. 4a. The resolution procedure 450 employs a serially reusable process-level lock 808 (FIG. 8) and an event-in-process (EIP) flag 810 which, when set, indicates that an event is currently being processed. EIP flag 810 is set at the start of processing of each event by its event handler and is reset at the end of processing of each event by its event handler, as described below.

Each event handler 410 or 412, upon gaining control from its thread 406 or 408, first acquires (452) lock 808. (If the lock 808 is currently held by another thread, the requesting event handler is suspended until the lock has been released by the holding thread.) Upon obtaining the lock (454), the event handler 410 or 412 checks (458) the flag 810. If the flag 810 is not set (460), the event handler sets (462) the flag, releases (464) the lock 808, and completes (466) the procedure shown in FIG. 4 for a winning event handler 410. If, on the other hand, the flag 810 is already set (460), the event handler releases (468) the lock 808 without modifying the flag 810 and completes (470) the procedure shown in FIG. 4 for a losing event handler 412.

In the example shown in FIG. 4, as indicated above, it is assumed that event handler 410 won the contention while event handler 412 lost the contention. The event handler 410 that won the contention handles the event 402 as described above for FIGS. 2–3. Thus, event handler 410 performs steps 414, 416, 418 and 420 that are similar to the steps 222, 228, 230 and 234 shown for event handler 220 in FIG. 2.

Figure 11:
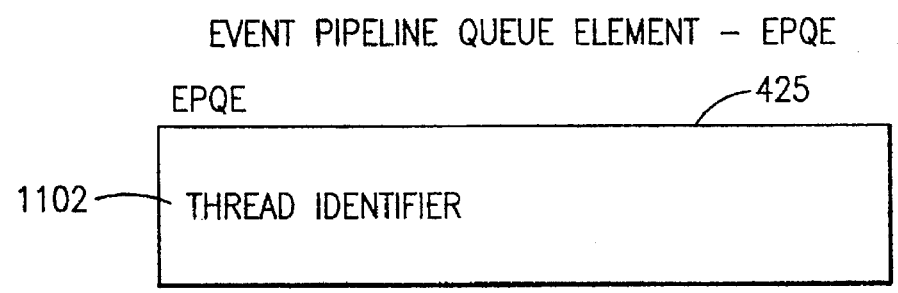
FIG. 11 shows an event pipeline queue (EPQ) element of the present invention.

Referring now also to FIG. 11, there is defined in system memory an event pipeline queue (EPQ) 424 consisting of EPQ elements (EPQEs) 425 for storing the identifiers 1102 of threads whose event processing must be deferred because the event of another thread is currently being handled. EPQ 424 contains one element 425 for each deferred thread. Elements 425 may be added to or removed from the queue 424 either in the usual first in, first out (FIFO) manner or, as in the present embodiment, in the last in, first out (LIFO) manner used to manage a stack. Any suitable means may be used to physically implement the queue 424.

The event handler 412 that lost the contention creates (422) an element 425 in EPQ 424 containing the thread identifier of thread 408, adding the entry to the queue. The event handler 412 then calls (426) the quiesce service 312 (FIG. 3) to freeze itself.

The debugger 102 remains unaware of the event pipeline queue 424 while it handles the event 402 on focus thread 406. When the event 402 on thread 406 ends as a result of a ptrace continue request (FIG. 2) being processed, the event handler 410 is posted by the debugger 102 through the ptrace service 204 as described above. Referring now also to FIG. 4b, upon being posted (472) by the debugger 102, the event handler 410 checks (474) the EPQ 424 to determine whether it is empty. If, as in this example, EPQ 424 is not empty (476), the event handler retrieves (428) the first EPQ element 425 (i.e., the element most recently added to the queue in a LIFO implementation) and, after resetting (429) the EIP flag 810 (FIG. 8), calls (430) the quiesce service 312 (FIG. 3) to unfreeze the thread 408 represented by the EPQ element 425. The event handler 410 on thread 406 then calls (432) the quiesce service 312 to freeze itself.

Because thread 408 is now unfrozen, it resumes running in the event handler 412 on that thread. The event handler 412 removes (434) its element 425 (FIG. 11) from the event pipeline queue 424 and, after setting the EIP flag 810 (FIG. 8), handles the event 404 on thread 408 generally as described above; thus, event handler 412 performs steps 436, 438 and 440 similar to steps 222, 230 and 234 performed by event handler 220 (FIG. 2). However, the event handler 412 does not call the quiesce service 312 to freeze any other threads because all threads are already frozen: any thread whose event has already been handled, such as thread 406, is frozen due to a call (432) to the quiesce service 312 to freeze itself, while the remaining threads 442 (threads 3 through N) of user application 104 were frozen (416) by the event handler 410 on thread 406.

When the event 404 on thread 408 ends as a result of a ptrace continue request (FIG. 2) being processed, the event handler 412 is posted by the debugger 102 through the ptrace service 204 as described above. Referring also to FIG. 4b, upon being posted (472), the event handler 412 checks (474) the EPQ 424 to determine whether it is empty. If, as in this example, EPQ 424 is now empty (476) (the element 425 for thread 408 having been purged from the queue at step 434), the event handler 412, after resetting EIP flag 810 (478), calls (444) the quiesce service 312 (FIG. 3) to unfreeze all threads 406 and 442. At this point the event handlers 410 and 412 return (446, 448) to their respective threads 406, 408 in the user application 104.

If event handler 412 had found an element 425 (476) in the queue when checking (474) EPQ 424 (because one or more other threads had also lost the contention with thread 406), it would have unfrozen the thread corresponding to that entry and have suspended itself in a manner similar to that of event handler 410 (steps 428–432). Similarly, if event handler 410 had found no element 425 (476) in the queue when checking (474) EPQ 424 (because no other thread was contending with thread 406), it would have reset the flag 810 (478), unfrozen the remaining threads 408 and 442 and returned to its originating thread 406 in a manner similar to that of event handler 412 (steps 444–448). In general, therefore, steps 428, 429, 430, 432 and 446 represent the steps performed by an event handler 410 or 412 upon finding an element 425 in the queue 424, whereas steps 478, 444 and 448 represent the steps performed by an event handler upon finding an empty queue.

Figure 5:
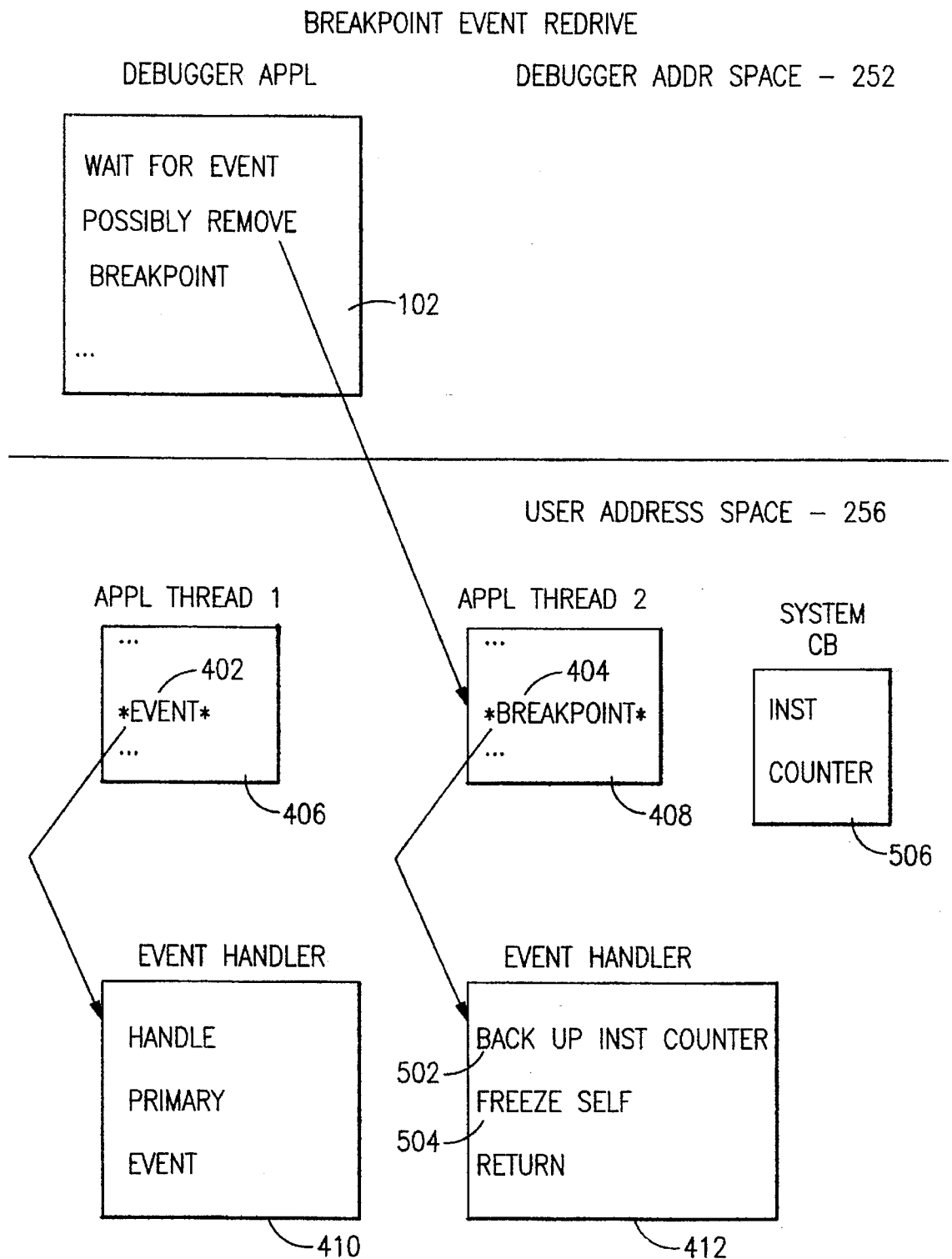
FIG. 5 shows the manner in which the thread control function of the present invention redrives breakpoint events.

FIG. 5 shows the flow for a special case of simultaneous events, namely when the contention loser represents a breakpoint event. Breakpoint events are Supervisor Call (SVC) instructions inserted into a user application 104 by the debugger 102, essentially overlaying whatever instruction already existed at that point in the application, as described in the article of D. Ault et al. (1993), entitled "Cross-Address Space Control Function", cited above. The debugger 102 needs to keep a table of the location of breakpoint instructions, and the actual application instructions that are overlaid. For this figure, simultaneous events 402 and 404 occur on thread 406 (thread 1) and thread 408 (thread 2), respectively, with thread 406 being the contention winner as before. The event handler 410 on thread 406 handles its event 402 as described in FIG. 4.

Figure 9:
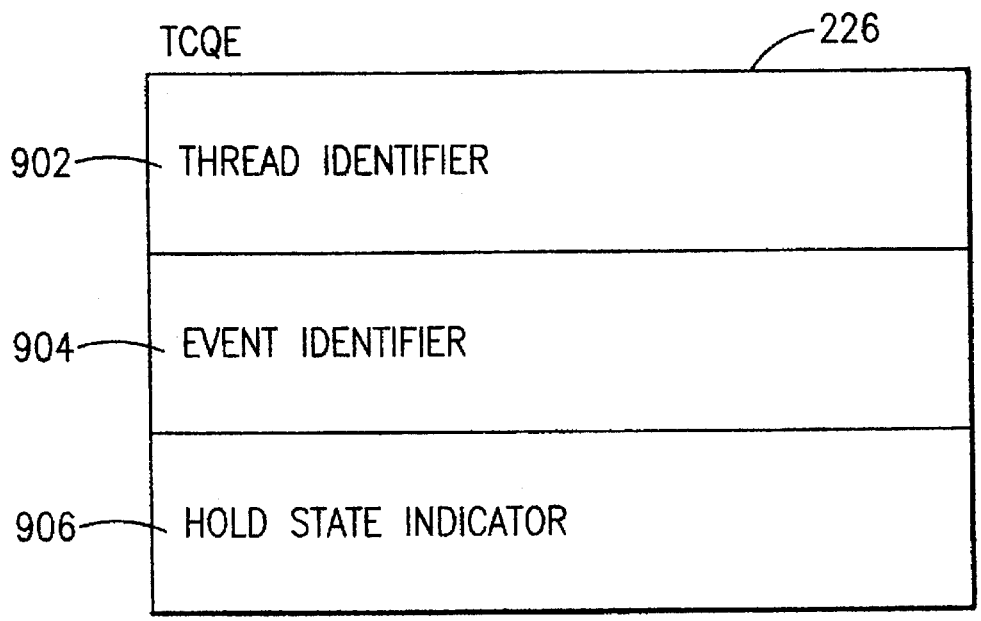
FIG. 9 shows a thread control queue (TCQ) element used by the thread control function of the present invention.

The event handler 412 on thread 408 recognizes that its event 404 is a breakpoint, based on the event identifier 904 (FIG. 9). Instead of creating an EPQ element 425 (FIG. 4), the event handler 412 sets up to redrive the breakpoint event. It does this by backing up (502) the instruction counter of the application on thread 408 by the number of bytes consumed by the breakpoint instruction, and then calling (504) the quiesce service 312 (FIG. 3) to freeze itself. The instruction counter is modified in a corresponding task-level control block 506 which is managed by the system dispatcher for thread 408. The reason this is necessary is that the debugger 102 may or may not remove the breakpoint 404 and replace the original instruction while the event 402 on thread 406 is in progress. Thus, when the event 402 on thread 406 ends and the event handler 412 on thread 408 resumes running, it just returns control to the application on thread 408. Since the instruction counter was backed up, it now points to either the still-intact breakpoint instruction 404 or the original application instruction. If the breakpoint 404 is still in place, a new event is initiated on thread 408.

Figure 6:
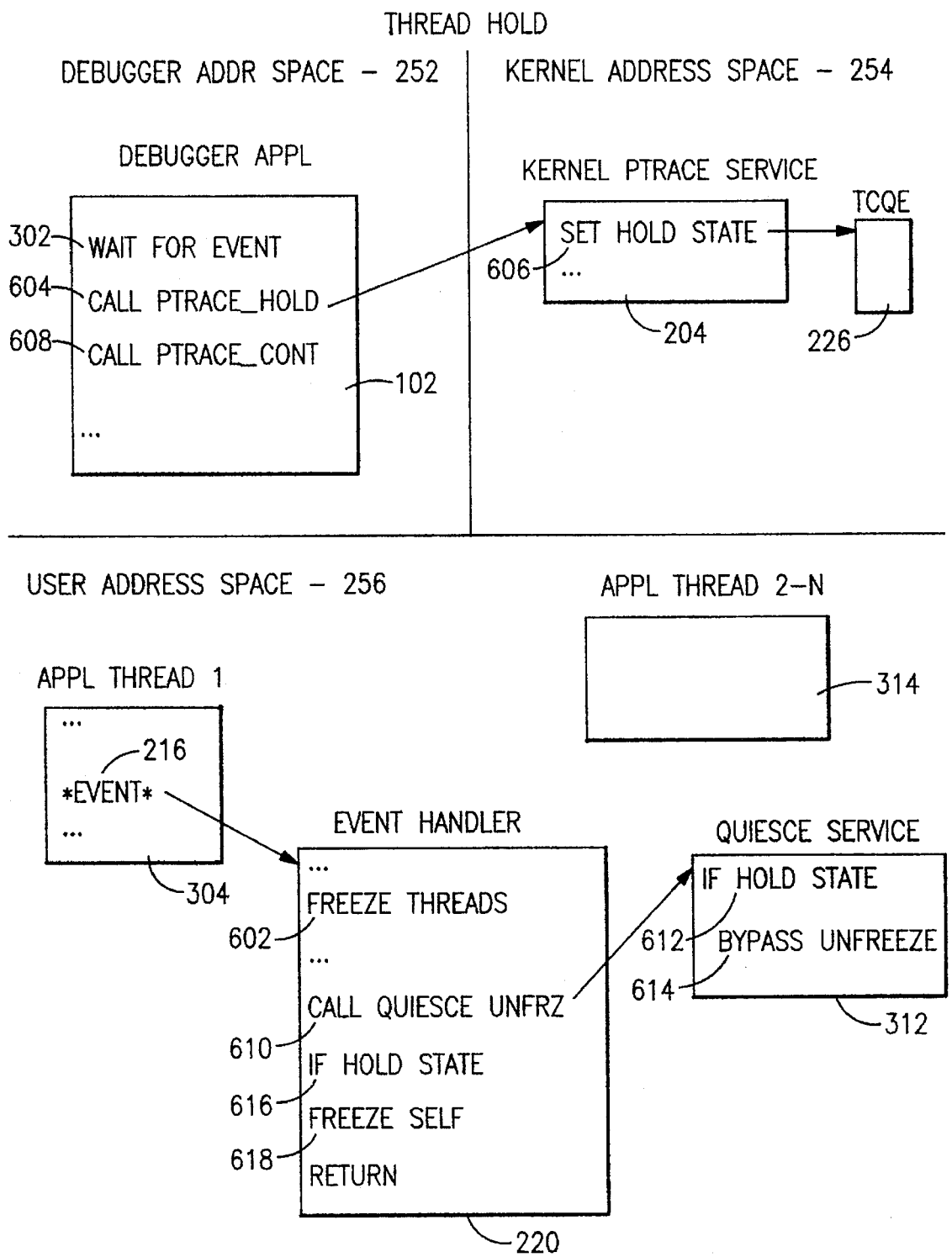
FIG. 6 shows the manner in which the thread control function of the present invention may be used to hold selected threads of a user application in a suspended state.

FIG. 6 shows the flow of the ptrace thread hold request. The debugger 102 may wish to control the flow of the application by preventing one or more threads from running. This could be used, for example, to step through the instructions of the application on one thread, while holding all other threads to prevent any interference.

An event 216 on application thread 304 (thread 1) causes the event handler 220 to freeze (602) all other threads 314 (threads 2 through N). When the debugger 102 is notified of the event 216, it calls (604) the ptrace service 204 to perform the hold request. The ptrace service 204 sets (606) the hold state indicator 906 (FIG. 9) in the TCQ entry 226 for the thread 304 or 314 that is the target of the ptrace request. The debugger 102 may repeat this for any number of threads. When the debugger 102 issues (608) a ptrace continue request, the event handler 220 calls (610) the quiesce service 312 to unfreeze all other threads 314. The quiesce service 312 checks the TCQ entry 226 for each thread it is about to unfreeze. If the hold state indicator 906 (FIG. 9) is set (612), the quiesce service 312 bypasses (614) the unfreeze for that thread 314. Thus, threads 314 that are held remain in a frozen state. The debugger 102 uses the ptrace hold request to unhold threads 304 or 314 in the same manner. For unhold, the ptrace service 204 resets the hold state indicator 906 (FIG. 9) in the TCQ entry 226 for the target thread 304 or 314. After unfreezing all other threads 314, the event handler 220 checks its own TCQ entry 226 to determine if the thread 304 on whose behalf it is running has been held. If so (616), the event handler 220 calls (618) the quiesce service 312 to freeze itself. This is necessary because the thread 304 on which the event handler 220 is running is not frozen at this point; to implement hold state the thread must be frozen.

Figure 7:
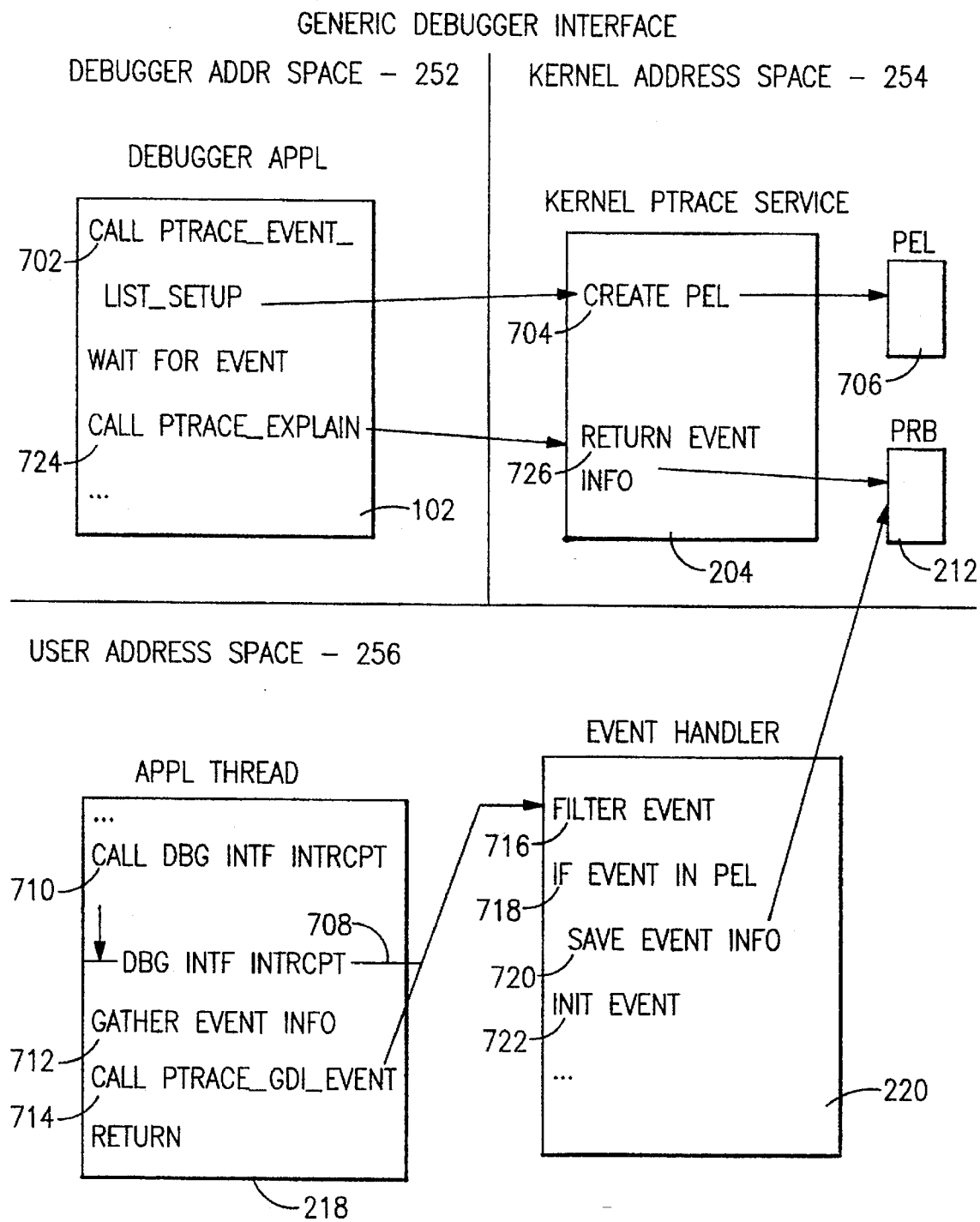
FIG. 7 shows the manner in which the thread control function of the present invention may be used to provide a generic debugger interface.
Figure 12:
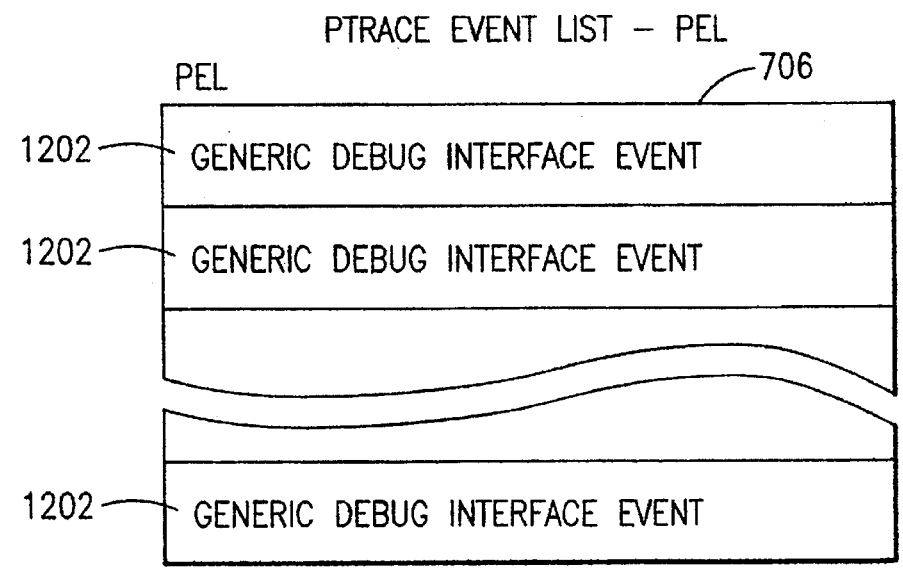
FIG. 12 shows the ptrace event list (PEL) of the present invention.

High-level language run-time events that occur on threads, such as events dealing with mutexes (simple locks) and condition variables (shared storage access using mutexes) are outside the scope of the thread control function. FIG. 7 shows a Generic Debugger Interface (GDI) that allows these types of events to be handled by the thread control function. The GDI is comprised of three components. First is the ptrace event list request. The debugger 102 calls (702) the ptrace service 204 to perform GDI event list setup. The ptrace service 204 creates (704) a Ptrace Event List (PEL) 706 that contains the list of GDI events 1202 (FIG. 12). The GDI events 1202 are those high-level language run-time events in which the debugger 102 has an interest.

The second GDI component is a debug interface interceptor 708 that high-level languages call when they wish to create an event. When an appropriate event occurs, the user application (actually the run-time library 106 on behalf of the user application) on thread 218 calls (710) the debug interface interceptor 708, which in turn gathers (712) appropriate information regarding the event and calls (714) the ptrace service 204 to initiate a GDI event. This event causes a call to the event handler 220 to be made as for any other event that the thread control function handles. The event handler 220 filters (716) the input using the PEL 706. If the input GDI event exists in the PEL 706 (718), then the event handler 220 saves (720) the event information 1006 gathered by the debug interface interceptor 708 in the PRB 212. It then initiates a new event as shown in FIG. 3.

The third and final GDI component is the ptrace explain request. When the debugger 102 is notified of the GDI event, it calls (724) the ptrace service 204 to perform the ptrace explain request. The ptrace service 204 returns (726) the GDI event information 1006 in the PRB 212 to the debugger 102.

The generic debugger interface allows a high-level language run-time library to communicate mutex and condition variable state changes and information to the debugger. Note that this support allows a debugger and a high-level language run-time function to communicate about high-level language run-time events without any knowledge by the thread control function about the events themselves, or about the content of the GDI event information 1006.

Figure 13:
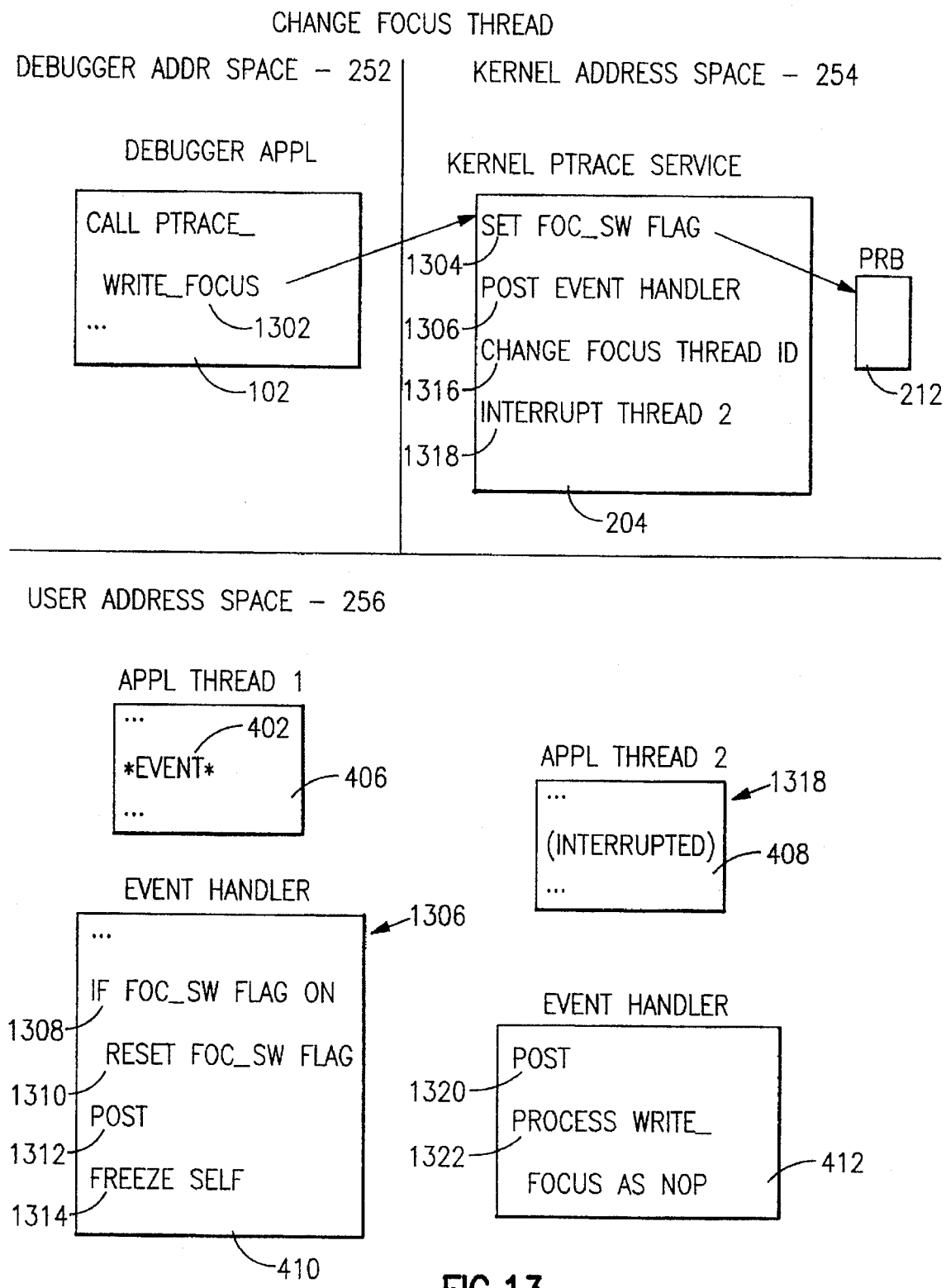
FIG. 13 shows the procedure of the present invention for changing the focus thread.

FIG. 13 shows the flow for changing focus to a different thread than the current focus thread. While the debugger 102 is handling an event on thread 406 (thread 1) —the current focus thread—it may decide to change focus to a different thread, in this example thread 408 (thread 2). One possible reason for a change of focus is to interrogate the status of the new focus thread 408 (its registers and storage, for example). The debugger 102 calls (1302) the ptrace service 204 to process a ptrace_write_focus request. The ptrace service 204 sets (1304) a focus switch flag 1008 (FIG. 10) in the PRB (212) for the user application. Flag 1008 indicates to the event handler 410 that a focus change is in progress. Next, the ptrace service 204 posts (1306) the event handler 410 running on the current focus thread 406, so that the ptrace_write_focus request can be processed, and waits.

Event handler 410 wakes up from its wait (step 420 in FIG. 4) and processes the ptrace_write_focus request. If the focus switch flag 1008 is set, as it is in this case (1308), the event handler 410 first resets (1310) the focus switch flag, so that the event handler 412 on the new focus thread 412 will not also try to switch focus, posts (1312) the ptrace service 204, and calls (1314) the quiesce service 312 (FIG. 3) to freeze itself. The ptrace service 204, when posted, changes (1316) the focus thread identifier 806 (FIG. 8) in the PCQE 210 for the user application to that of the new focus thread 408. At this point, focus has been successfully switched away from thread 406, and that thread is now frozen.

Next, the ptrace service 204 interrupts (1318) thread 408 and waits, causing entry to the event handler 412. Such interruption may be accomplished using any suitable mechanism, such as a service request block/interrupt request block (SRB/IRB) combination of the type disclosed in the above-identified copending application of D. F. Ault et al., that gets control running on the already frozen thread 408. The IRB detects that the thread is frozen and calls the event handler 412, so that the event handler actually runs under the IRB "on top of" the frozen thread 408.

The new event handler 412 posts (1320) the waiting ptrace service 204, and processes (1322) the ptrace_write_focus request as a no-op. At this point, the new event handler 412 enters the previously described loop 316 (FIG. 3) in which it awaits requests from the debugger 102. Processing the ptrace_write_focus request on the new event handler 412 in this manner establishes a means for processing subsequent ptrace requests issued by the debugger 102 on the new focus thread 408.

The present invention works for true preemptively dispatching operating systems by providing synchronous suspension of nonfocus threads and an event pipeline queue for simultaneous events. It provides for generic support of high level language-driven events through the generic debugger interface.

What is claimed is:

1. In a computer system having an application comprising a plurality of threads executing concurrently in a common address space, a method of handling the occurrence of a new event on a first one of said threads while a previous event on a second one of said threads is currently being processed, comprising the steps of:

(a) defining a flag indicating whether a previous event on one of said threads is currently being processed;

(b) defining a deferred event queue containing an entry for each event that cannot be processed immediately, said entry identifying the thread on which a deferred event occurred; and (c) having said first one of said threads, in response to the occurrence of a new event on said thread:

(1) test said flag to determine whether a previous event is currently being processed;

(2) if said flag indicates that a previous event is not being processed, set said flag and process the new event; and (3) if said flag indicates that a previous event is being processed, add the new event to said queue and suspend its own execution without processing said new event.

2. The method of claim 1 wherein the step of processing the new event includes the step of suspending the execution of each remaining thread of said application.

3. The method of claim 1 wherein said first one of said threads, upon completion of processing of said new event, performs the further steps of:

testing said deferred event queue to determine whether there is any deferred event requiring processing;

if there is no event in said deferred event queue, resuming normal execution of said threads; and if there is a deferred event in said deferred event queue, resuming execution of the thread on which the deferred event occurred to permit said thread to process the deferred event.

4. The method of claim 3 wherein the thread that has completed the processing of an event suspends its own execution upon resuming execution of the thread on which the deferred event occurred.

5. The method of claim 3 wherein the thread on which the deferred event occurred removes the deferred queue entry for said deferred event upon resuming execution.

6. The method of claim 1 wherein said events include breakpoints and wherein the execution of each of said threads is controlled by an instruction counter pointing to an instruction next to be executed, said step (c)(3) comprising the steps of:

if the new event is not a breakpoint, adding the new event to said queue and suspending execution of said first one of said threads;

if said new event is a breakpoint, altering the instruction counter of said first one of said threads to point to said breakpoint and suspending execution of said thread without adding said new event to said queue.

* * * * *